United States Patent [19]
Weston

[11] 3,724,699
[45] Apr. 3, 1973

[54] HORIZONTALLY PIVOTED FORKLIFT APPARATUS

[75] Inventor: David C. Weston, Culver City, Calif.

[73] Assignee: Interstate Restaurant Supply Company, Inc., Los Angeles, Calif.

[22] Filed: July 30, 1971

[21] Appl. No.: 167,602

Related U.S. Application Data

[62] Division of Ser. No. 823,762, May 12, 1969, Pat. No. 3,606,039.

[52] U.S. Cl..............214/730, 214/750, 214/16.4 A
[51] Int. Cl................................................B66f 9/14
[58] Field of Search.........214/730, 731, 750, 16.4 R, 214/16.4 A

[56] References Cited

UNITED STATES PATENTS

| | | | |
|---|---|---|---|
| 3,092,268 | 6/1963 | Powers | 214/730 X |
| 3,154,208 | 10/1964 | Barrett | 214/730 |
| 3,557,974 | 1/1971 | Ostrander | 214/16.4 A |

FOREIGN PATENTS OR APPLICATIONS

| | | |
|---|---|---|
| 690,736 | 6/1930 | France |
| 1,229,454 | 11/1966 | Germany |
| 750,793 | 6/1956 | Great Britain |

Primary Examiner—Gerald M. Forlenza
Assistant Examiner—Raymond B. Johnson
Attorney—Fulwider, Patton, Rieber, Lee & Utecht

[57] ABSTRACT

Fork lift apparatus for depositing and retrieving pallets on opposite sides of a narrow aisle and including a fork frame carried on support means movable longitudinally in the aisle and formed with transversely extending truck tracks. Transversely shiftable trucks are mounted on the tracks and have one end of elongated tine means pivotably connected therewith. Fork flip means is provided for selectively rotating the tines through 180° to extend to one side or the other of the fork frame.

9 Claims, 17 Drawing Figures

HORIZONTALLY PIVOTED FORKLIFT APPARATUS

CROSS REFERENCE TO RELATED APPLICATION

This application is a divisional application of U.S. Ser. No. 823,762 filed May 12, 1969 and now U.S. Pat. No. 3,606,039 granted Sept. 20, 1971.

BACKGROUND OF THE INVENTION

1. Field of the Invention

The present invention relates generally to fork lift devices and more particularly to fork lift devices that move longitudinally in the aisle and may be extended to either side of the aisle for retrieving pallets therefrom.

2. Description of the Prior Art

Fork lift devices have been proposed which include L-shaped fork elements formed with pairs of tines extending at 90° to one another and rotatable whereby the one set of tines may extend to one side of the device and the fork element may be rotated through 90 degrees to extend the other set of tines to the other side of the fork device. A fork lift device of this type is shown in U.S. Pat. No. 3,168,956. Fork lift devices of this type suffer the shortcoming that the L-shaped fork elements occupy considerable transverse space as they are rotated through 90° thereby requiring relatively wide aisles to accommodate operation thereof.

SUMMARY OF THE INVENTION

The present invention is characterized by a fork lift device having substantially planar tines that are pivotally carried from transversely shiftable trucks and that are rotatable through a full 180° to extend to one side or the other of the device.

Other objects and advantages of the present invention will be made apparent from the consideration of the following description, when taken in conjunction with the accompanying drawings.

DESCRIPTION OF THE PREFERRED EMBODIMENT

In storing articles in a warehouse it is common practice to provide vertical racks, generally designated 31 and 33 (FIG. 1) which receive pallets 35 loaded with articles 37. The stacker crane system of present invention is intended for retrieval of such articles 37 from the stacks and includes a vertical gantry frame, generally designated 41, carried on upper and lower tracks 43 and 45 that extend longitudinally in an aisle formed between the stacks 31 and 33. The gantry frame 41 mounts an elevator, generally designated 47, which has an operator's platform 48 thereon and mounts a pair of side-by-side unloading or picker conveyors, generally designated 51 and 53. Extending longitudinally of the tracks 43 and 45 are a pair of side-by-side collecting conveyors 57 and 59 which are in alignment with the conveyors 51 and 53 and lead to a collecting point (not shown) at one end of the stacks 31 and 33.

Figure 1:
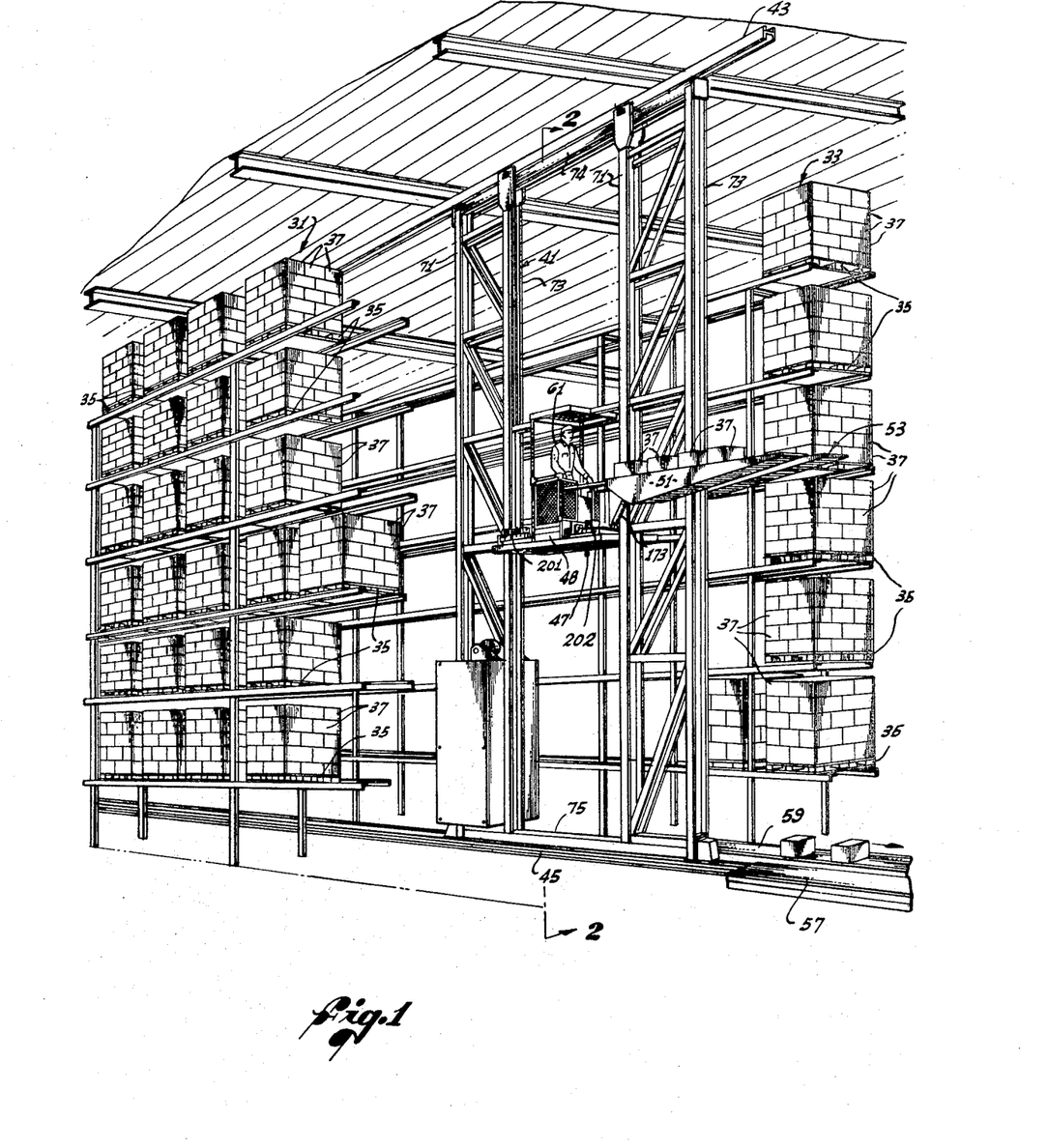
FIG. 1 is a fragmentary perspective view of a stacker crane embodying the present invention.

Thus, the operator 61 may manipulate the controls (not shown) to move the frame 41 longitudinally on its tracks 43 and 45 to a selected position along the stacks 31 and 33. Simultaneously the operator 61 may be raising the elevator 47 to a selected height for convenient selection of certain of the articles 37. The operator 61 then selects the articles 37 and deposits them on the picker conveyors 51 and 53 as shown in FIG. 1. The elevator 47 may then be lowered and the conveyors 51 and 53 inclined to lower their free ends to the position shown in FIG. 13 and such conveyors actuated to feed the articles 37 onto the collecting conveyors 57 and 59 for transportation to the collecting point (not shown).

Figure 2:
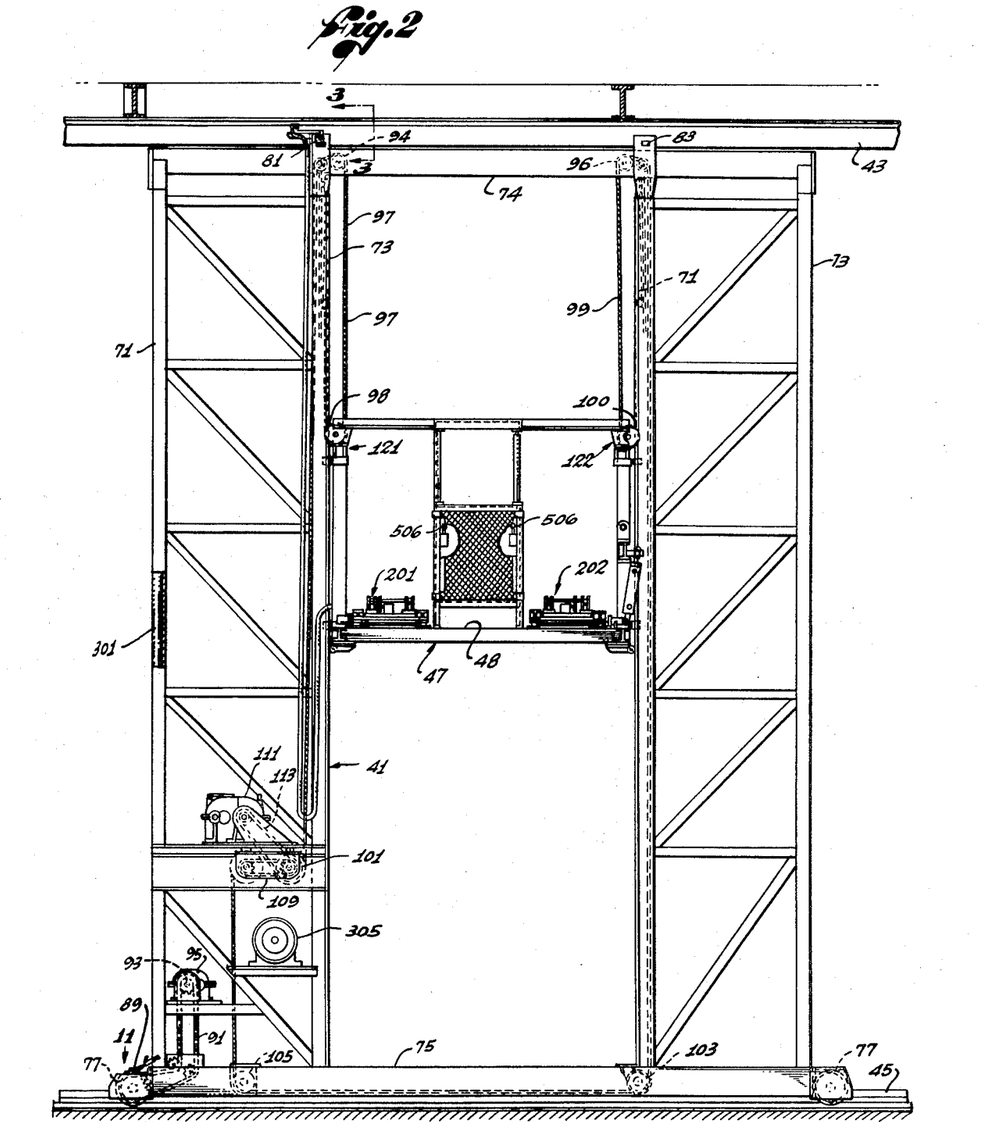
FIG. 2 is an elevational view, in enlarged scale, taken along the line 2—2 of FIG. 1.

Referring to FIGS. 1 and 2, the gantry frame 41 includes two pairs of aligned vertical I-beams 71 and 73 which are interconnected on their upper and lower ends by a horizontal beams 74 and 75. The gantry frame 41 is carried on wheels 77 which roll along the track 45. The upper end of the gantry frame 41 mounts spaced apart horizontal wheels 81 and 83 which cooperate to receive the track 43 therebetween.

Referring to FIG. 2, one of the support wheels 77 has a pinion 89 mounted thereon and a chain 91 connects such pinion with a drive pinion 93 carried by the drive shaft of a hydraulic drive motor 95.

Still referring to FIG. 2, a pair of pulleys 94 and 96 are mounted on the cross beam 24 at the upper end of the frame 41 and support respective suspension cables 97 and 99 threaded thereover, such cables being also threaded over pulleys 98 and 100 on the elevator 47.

One end of the cable 97 extends upwardly from the pulley 98 and connects with the beam 74 and the other end extends downwardly from the pulley 94 and winds on a drum 101. Likewise, one end of the cable 99 extends upwardly from the pulley 100 and connects to the beam 74 and the other end extends downwardly from the pulley 95 and threads around pulleys 103 and 105 (FIG. 2) at the bottom of the frame 41 and then extends upwardly and connects with drum 107. The drums 101 and 107 are connected together by a chain 109 and the drum 101 is driven by a hydraulic motor 111 through a chain 113.

Figures 4, 5, 6, 7, 8:
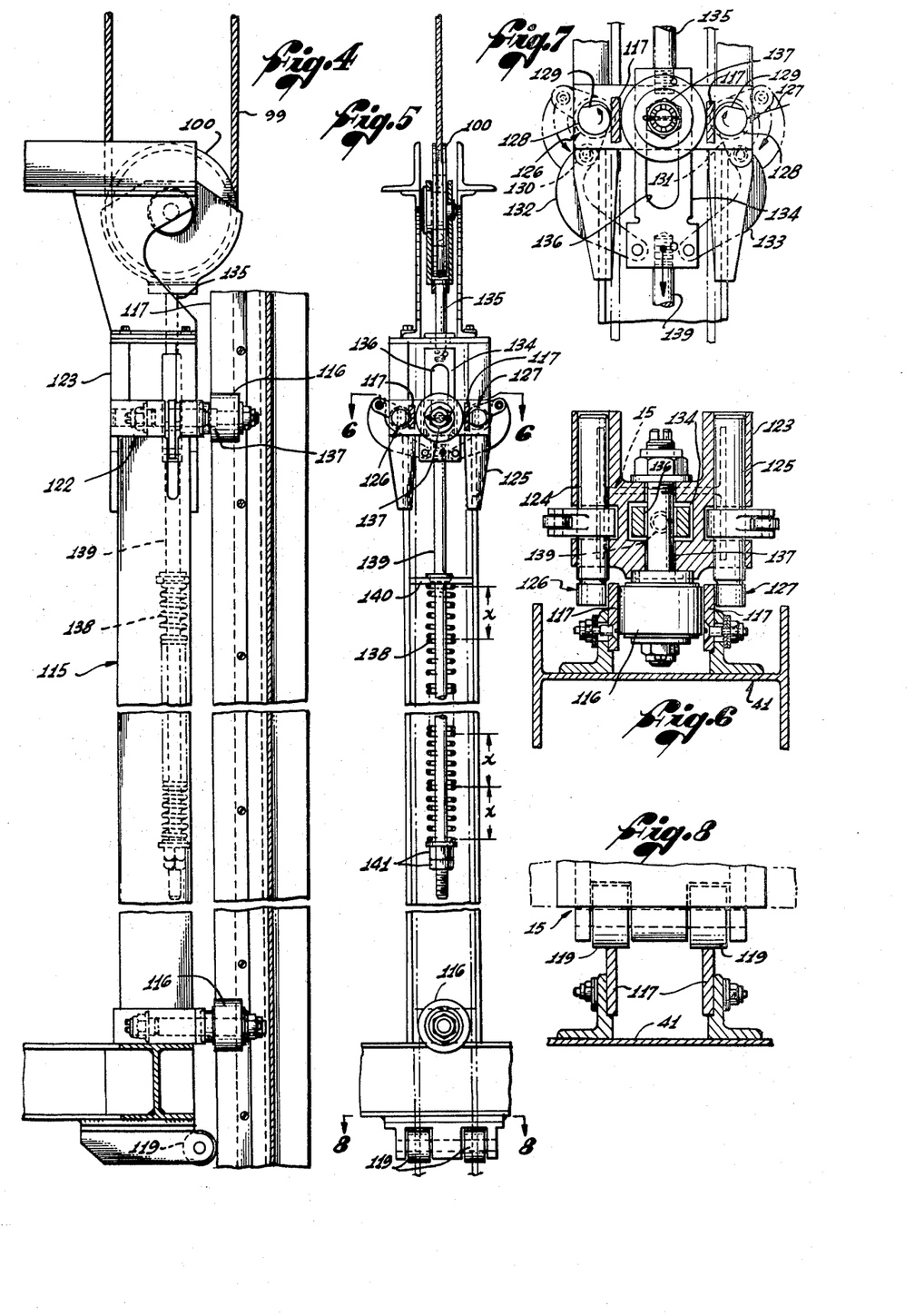
FIG. 4 is a fragmentary front view, in enlarged scale, of the stacker crane shown in FIG. 1 and depicting a braking system for preventing catastrophic falling of the elevator.
FIG. 5 is a right end view of the braking system shown in FIG. 4.
FIG. 6 is a horizontal sectional view, in enlarged scale, taken along the line 6—6 of FIG. 5.
FIG. 7 is a partial elevational end view, in enlarged scale, similar to FIG. 5.
FIG. 8 is a horizontal sectional view, in enlarged scale, taken along the line 8—8 of FIG. 5.
Figure 10:
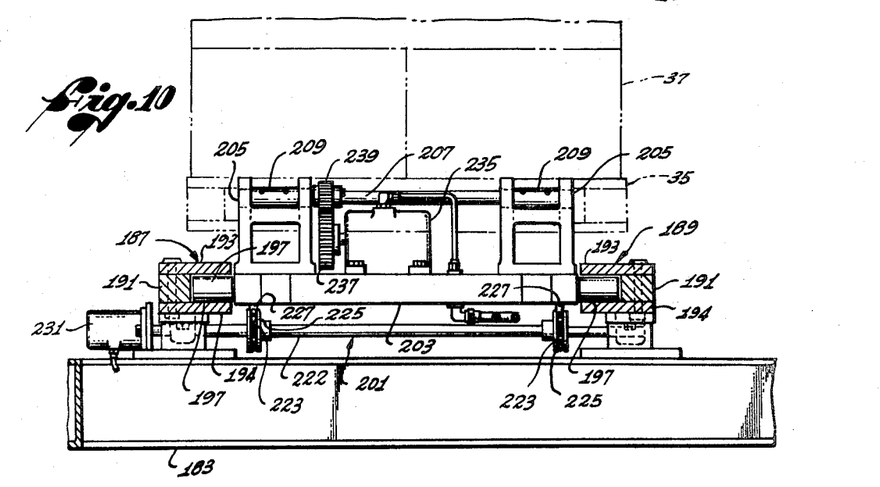
FIG. 10 is a vertical sectional view taken along the line 10—10 of FIG. 9.

Referring to FIGS. 4 and 5, the elevator 47 includes a pair of vertical support posts, generally designated 115, on its opposite ends, such posts mounting stabilizing rollers 116 which interfit tracks formed between vertical guides 117 (FIG. 6) mounted on the adjacent vertical beams 71 and 73 of the gantry 41. Referring to FIG. 10, the posts 15 also mount stabilizing rollers 119 for engagement with the edges of the guides 117 to prevent longitudinal sway of the elevator 47.

Referring to FIGS. 2, 4 and 5, the elevator 47 is provided with a pair of brakes, generally designated 121 and 122, which are responsive to separation of the respective suspension cables 97 and 99 to frictionally engage the tracks 117 on the gantry 41 to prevent falling of such elevator. As best seen in FIG. 7, the brakes 121 and 122 each include a fitting 123 (FIG. 6) mounted on the respective upright post 115 and having a pair of horizontal pivot shafts 124 and 125 journaled therein. As best shown in FIGS. 5, 6 and 7, one end of the respective shafts 124 and 125 is formed with respective cams, generally designated 126 and 127, having an arcuate peripheral portion 128 for frictional engagement with the respective guides 117 and a flat portion 129. The shafts 124 and 125 are formed with intermediate radially extending lever arms 130 and 131 which are forked on their respective free ends for receiving the upper ends of respective elbow-shaped connecting links 132 and 133. The lower ends of such connecting links are connected to a slide 134, to which the respective elevator lifting pulleys 98 and 100 are anchored by means of vertical rods 135. The slide 134 is formed with a vertically elongated slot 136 which receives a transverse shaft 137 (FIGS. 6 and 7) for limiting vertical reciprocation of such slide. The slide 134 is biased downwardly by means of a coil compression spring 138 which is telescoped over a downwardly extending rod 139 carried from the slide 134, such spring being sandwiched between a horizontal flange 140 in the respective posts 115 and lock nuts 141 screwed onto the lower end of the rod 139. Thus, the cams 126 and 127 will normally be oriented as shown in FIG. 5 to disengage the sides of the guides 117 but when the upward pull on either of the cables 97 or 99 is lost the respective spring 138 will bias the slide 134 downwardly to orient the cams 126 and 127 as shown in FIG. 7 to frictionally engage the guides 117.

Figures 11, 12, 13:
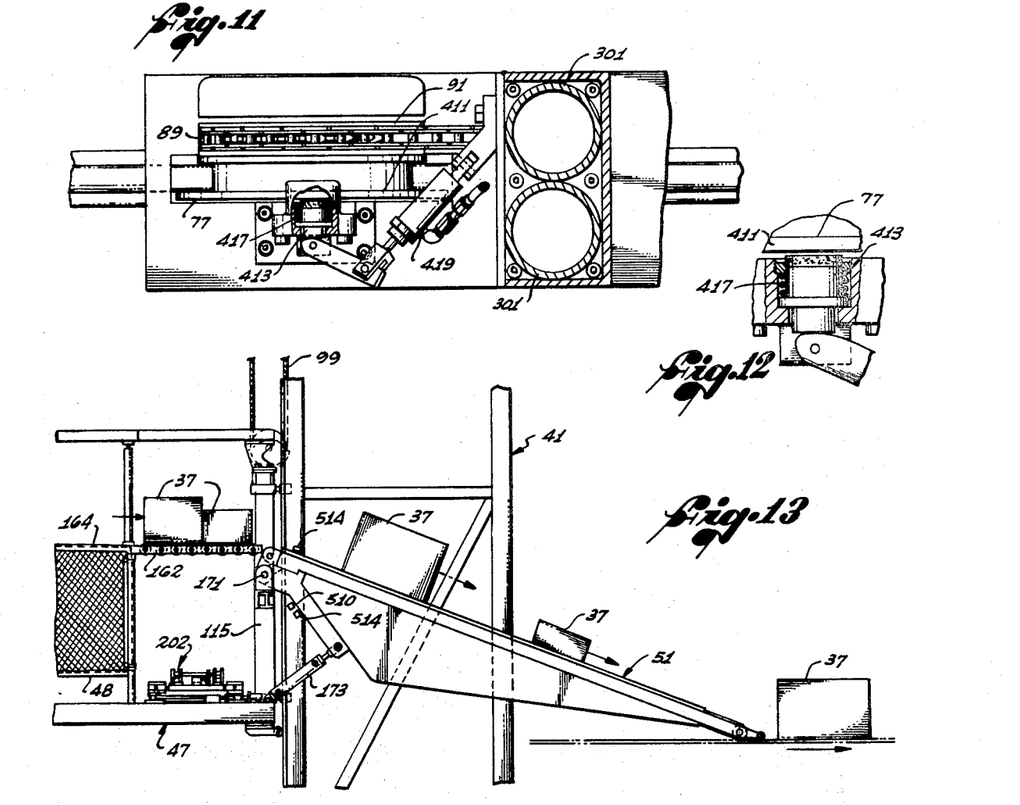
FIG. 11 is a partial top view, in enlarged scale and partially broken away, of the area designated 11 in FIG. 2.
FIG. 12 is a partial view, in enlarged scale, of FIG. 11.
FIG. 13 is a partial front view, in enlarged scale, of the stacker crane system shown in FIG. 1.

Referring to FIG. 13, a pair of removable roller conveyors 162 are supported on their one ends from a cage 164 surrounding the operator's platform 48 and on their opposite ends by the elevator 47 for alignment with the adjacent ends of the respective picker conveyors 51 and 53.

Figure 14:
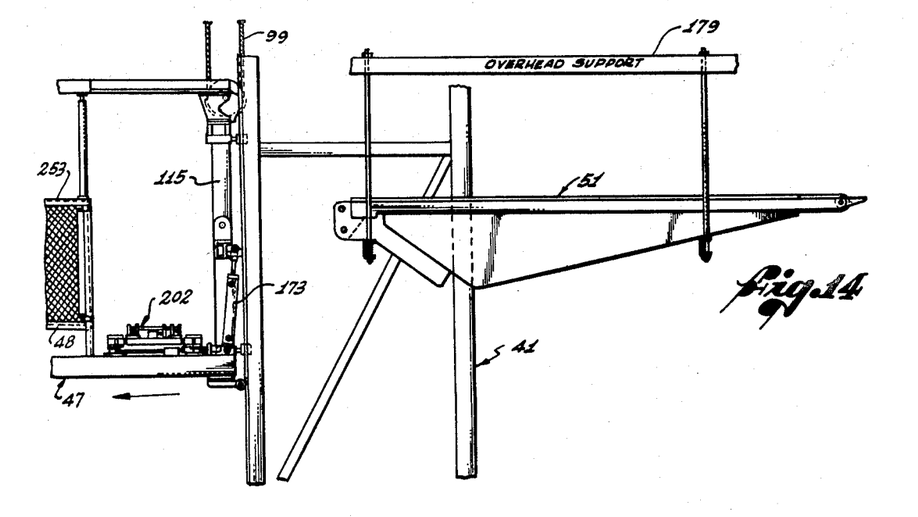
FIG. 14 is a partial front view similar to FIG. 13.

Referring to FIGS. 1, 13 and 14, the unloading conveyors 51 and 53 are connected to the elevator 47 by means of pivot pins 171 and pitch control cylinders 173. Thus, the unloading conveyors 51 may be moved from the horizontal position shown in FIG. 1 to the inclined position shown in FIG. 13 for unloading the articles 37. Also, the conveyors 51 and 53 may be disengaged from the elevator 47 and supported in an overhead cradle 179 (FIG. 14) when not in use.

Figure 9:
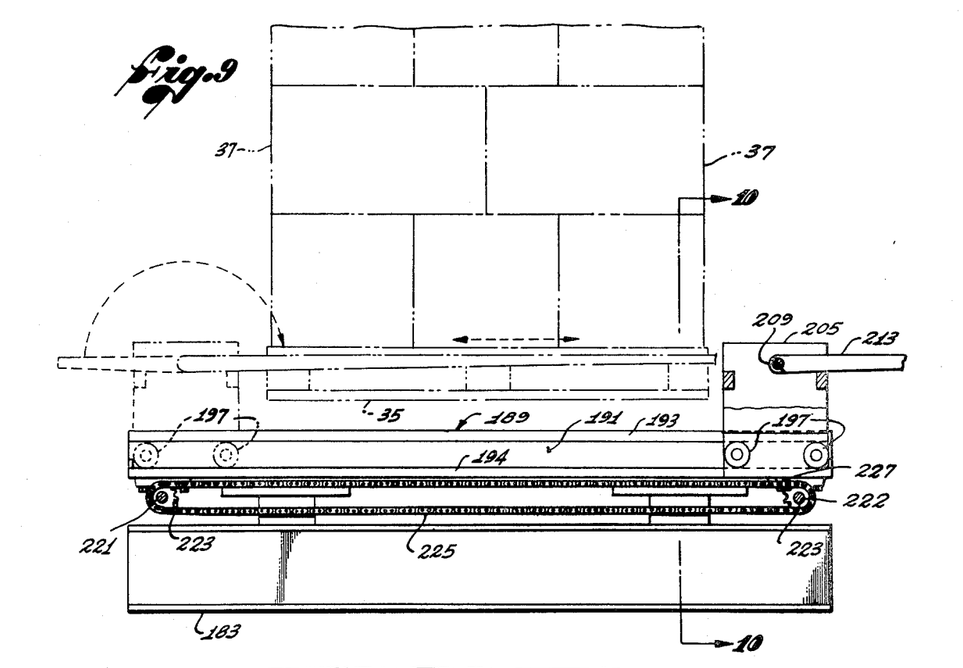
FIG. 9 is a right end view, in enlarged scale, of the elevator included in the stacker crane shown in FIG. 1.

Referring to FIGS. 9 and 10, the elevator 47 includes a frame 183 which support a pair of transverse tracks, generally designated 187 and 189, disposed on either side of the operator's platform 48. The tracks 187 and 189 are C-shaped in cross section and are formed by spacers 191 sandwiched between top and bottom plates 193 and 194, respectively. The plates 193 and 104 overhand such spacers 191 and receive rollers 197 therebetween for supporting respective forks, generally designated 201 and 202 (FIG. 2).

Still referring to FIG. 10, the respective forks 201 and 202 include transverse beams forming trucks 203 supported on their opposite ends by the rollers 197 and having a pair of mounts 205 supported thereon. A pivot rod 207 has its opposite ends journaled through spaced apart flanges of the mounts 205 and receives collars 209 which form the base of a pair of tines 213.

Referring to FIGS. 9 and 10, a pair of longitudinally extending shafts 221 are mounted on opposite sides of the elevator 47 and each mount a pair of pinions 223. Threaded over the pinions 223 are drive chains 225 which are connected to the trucks 203 of the respective forks 201 and 202 by fittings 227. Hydraulic motors 231 and 232 (FIGS. 10 and 15) are mounted on the elevator 47 and have their drive shafts connected with the ends of the shafts 221 of the respective forks 201 and 202 for driving them transversely relative to the elevator 47.

Figure 15:
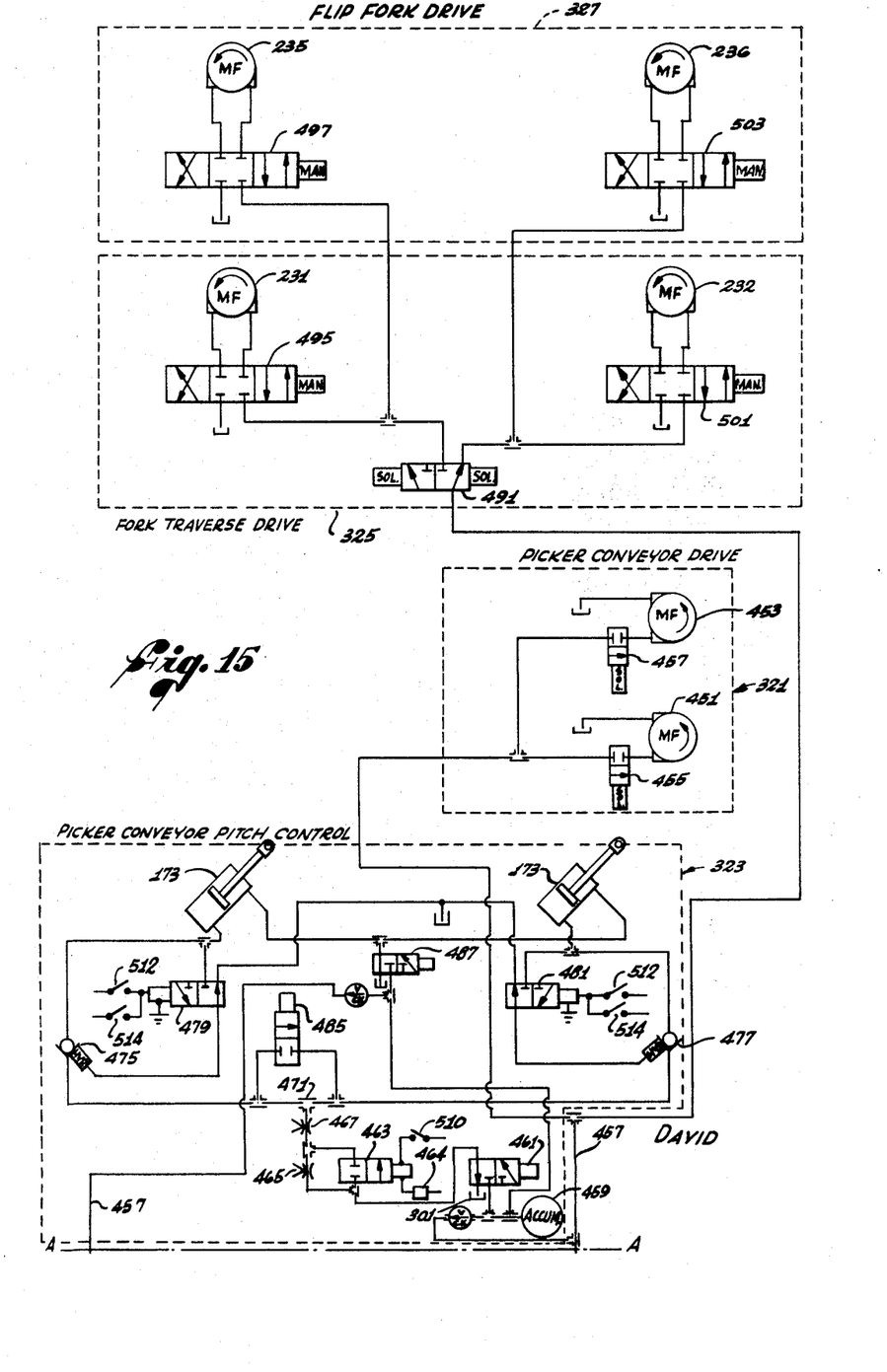
FIG. 15 is a schematic view of a portion of a hydraulic system which may be utilized with the stacker crane shown in FIG. 1.

Still referring to FIGS. 10 and 15, hydraulic motors 235 and 236 are mounted on the respective forks 201 and 202 and have drive pinions 237 mounted on their drive shafts, which pinions mesh with driven pinions 239 mounted on the pivot shafts 207 of the respective forks 201 and 202.

Figure 3:
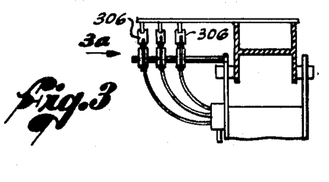
FIG. 3 is a partial vertical sectional view, in enlarged scale, taken along the line 3—3 of FIG. 2.
Figure 3A:
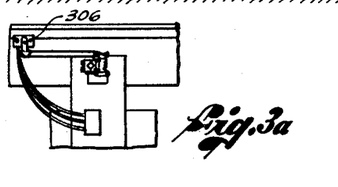
FIG. 3a is an elevational view taken from the side designated 3a in FIG. 3.
Figure 16:
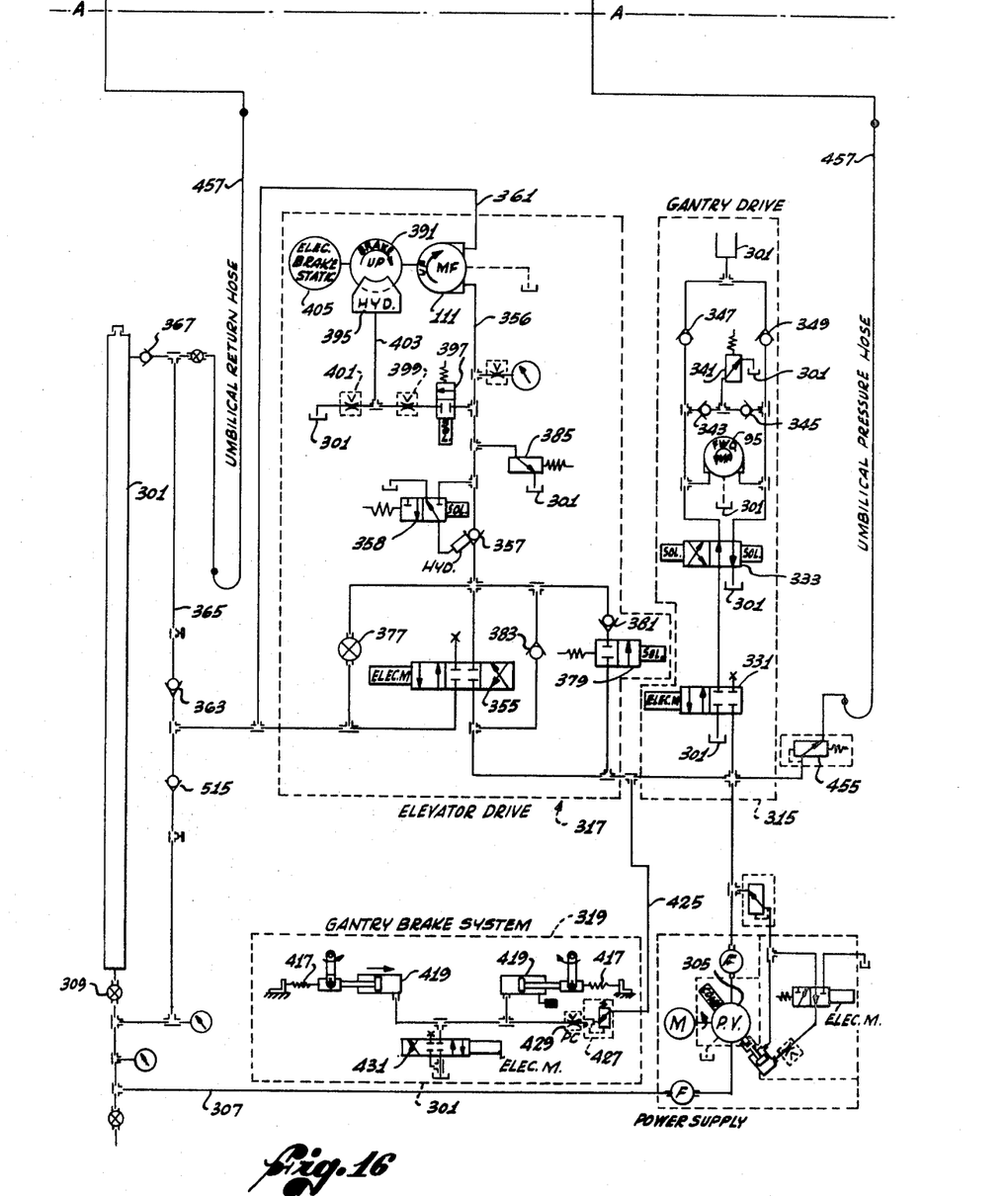
FIG. 16 is a partial schematic view of a second portion of the hydraulic system which may be utilized with the stacker crane system shown in FIG. 1.

Referring to FIG. 16, a pair of steel pipes extend up the right hand end of the gantry 41 to form a hydraulic fluid reservoir 301. The reservoir 301 has good heat transfer characteristics to rapidly dissipate heat from the hydraulic fluid. The lower end of the reservoir 301 is connected with a variable volume compensated pump 305 by means of a conduit 307 having a shut off valve 309 therein. As shown in FIG. 2, the pump 305 is disposed adjacent the bottom end of the reservoir 301 so a head of hydraulic fluid will be maintained thereon. The electric motor included in the pump 305 is powered by electric current received from pick up bars 306 (FIGS. 3 and 3a) carried from the gantry 41. The outlet of the pump 305 is connected with a gantry drive 315, elevator drive 317, gantry brake system 319, picker conveyor 321 (FIG. 15), picker conveyor pitch control 323, fork transverse drive 325, and fork flip drive 327.

The gantry drive 315 includes a proportional four-way valve 331 which acts to meter hydraulic fluid from the pump 305 to a solenoid operated proportional four-way valve 333 which acts to control the direction of movement of the gantry 41 by controlling introduction of hydraulic fluid to one side or the other of the gantry drive motor 95. A relief valve 341 is connected across the motor 95 by means of conduits leading back to the reservoir 301 and including oppositely directed check valves 343 and 345 which open at a selected pressure whereby if the hydraulic pump 305 provides fluid at too great a rate, such fluid will be relieved to the reservoir 301. Also, a pair of check valves 347 and 349 check flow from both outlet ports of the directional valve 333 to the reservoir 301 whereby if the metering valve 331 is closed while the gantry 41 is moving down its track and the momentum of such gantry continues to turn the motor 95, hydraulic fluid will be available from the reservoir 31 through the relief valve 341 to whichever side of the motor 95 is demanding such fluid thus avoiding cavitation.

The elevator drive 317 includes a proportional, four-way valve 355 which receives hydraulic fluid from the pump 305 and meters it through a pilot operated check valve 357 to the elevator motor 111 via a conduit 356. During upward travel of the elevator 47, hydraulic fluid from the motor 111 is fed back through a conduit 361, check valve 363, conduit 365 and finally through check valve 367 and into the top of the reservoir 301.

Connected in parallel with the elevator control valve 355 is a hand valve 377 disposed in the lower part of the warehouse whereby a workman may lower the elevator while standing on the floor. A bypass valve 379 is also connected in parallel with the control valve 355 and in series with a check valve 381 and may be utilized to bypass the control valve 355 when moving the elevator 47 up at full speed. Also, connected in parallel with the elevator control valve 355 is a check valve 383 which will permit enough hydraulic fluid to bypass such control valve when the elevator 47 is at rest and its weight is acting on the motor 111 tending to reverse it, causing it to act as a pump, to apply sufficient pressure to the inlet port of the control valve 355 to operate it even though the pump 305 is inoperative. A relief valve 385 is provided in the conduit to the motor 111 to prevent application of excessive pressure.

It will be noted that the elevator 47 will tend to reverse the motor 111 from the direction indicated by the directional area in FIG. 16 thus creating a substantial back pressure against the control valve 355 while such elevator is being lowered. Rather than relying on metering of the hydraulic fluid through such control valve 355 and causing a resultant generation of heat, a disc break 391 is included on the drive shaft of the motor 111 and actuation thereof is responsive to the pressure build up resulting from the weight of the elevator on the motor 111. A solenoid valve 397 is connected with the conduit 356 leading to the elevator motor 111 and controls the introduction of fluid to the brake cylinders 395. A pair of variable orifices 399 and 401 are connected in a series with the solenoid valve 397 and a conduit 403 is connected therebetween and leads to the brake cylinder 395 to affect actuation thereof. The second orifice 401 is somewhat smaller than the first orifice 399 to effect a pressure build therebetween depending on the degree to which the control valve 355 is opened and resultant pressure build up in the conduit 356. Also carried on the drive shaft of the hydraulic motor 111 is an electric brake 405 which is applied by discontinuing current thereto.

Referring to FIGS. 11, 12 and 16, the wheels 77 are formed with radially extending peripheral flanges 411 and a brake piston 413 is provided for frictional engagement therewith to brake the gantry 41. The piston 413 is biased from engagement with the flange 411 by means of a compression spring 417 and actuation thereof is affected by a hydraulic cylinder 419. Referring to FIG. 11, hydraulic fluid is provided to the cylinder 419 from the pump 305 through a conduit 425 to a pressure reducing valve 427. Fluid from the valve 427 is fed through an orifice 429 to a proportional four-way valve 431. The valve 431 is normally closed thus preventing fluid flow from the reservoir 301 and causing the cylinders 419 to be extended thus releasing the brakes. Application of the brakes if affected by opening the valve 431 to enable the bias of the compression springs 417 to extend the pistons 413 and apply the brakes.

Referring to FIGS. 13 and 15, the belts of the picker conveyors 51 and 53 are driven by respective hydraulic motors 451 and 453 having flow thereto controlled by respective solenoid valve 455 and 457.

As best shown in FIG. 16, hydraulic fluid from the pump 305 is passed through a relief valve 455 and an umbilical hose 457 to an accumulator 459 having a pitch control solenoid valve 461 connected therewith and in series with a rapid adjustment solenoid valve 463. The rapid adjustment solenoid 463 is in electrical circuit with a timer 464 which is actuated by actuation of the pitch control solenoid 461 and after a predetermined time lapse opens the solenoid valve 463. The solenoid valve 463 is bypassed by an orifice 465 and has a second orifice 467 in series therewith. The rapid solenoid valve 463 is connected with the outlet of a conventional flow divider 471 which has its inlets connected with the dead ends of the respective picker conveyor pitch control cylinders 173. Flow from the cylinders 173 to the flow divider 471 is controlled by pilot operated check valves 475 and 477, actuation thereof being controlled by respective solenoid valves 479 and 481. A bypass solenoid 485 is connected across the flow divider 471. Hydraulic fluid to the rod ends of the cylinders 173 is controlled by a retraction solenoid 487 which controls flow to the reservoir 459.

Referring to FIG. 15, actuation of the selected fork 201 or 202 is accomplished by a double acting solenoid valve 491 which controls fluid flow from the umbilical hose 457. Connected with one of the ports of the selection valve 491 is a manually operated valve 495 which controls flow to the hydraulic motor 231 that effects transverse movement of the fork 201. Connected in parallel with the elevator transverse valve 495 is a manual valve 497 for controlling operation of the hydraulic motor 235 that effects flipping of the fork 201. Connected with the other port of the selection valve 491 is a manual valve 501 for controlling flow to a second hydraulic motor 232 which moves the fork 202 transversely. Connected in parallel with the transverse valve 501 is a manual flip valve 503 that controls flow to the hydraulic motor 236 flipping the fork 202.

In operation, the stacker crane system of the present invention may be utilized for collecting selected articles from various locations within the warehouse and depositing them at a collecting point (not shown) for receipt by a delivery truck or, alternatively, for picking up pallets of articles to be stored in the warehouse and carrying such articles to a selected location in the vertical stacks 31 and 33. The former operation will be described first.

The forks 201 and 202 are maintained retracted and the roller conveyors 162 (FIG. 13) placed in position for receiving the articles 37. The operator 61 manipulates the controls 506 (FIG. 2), to convey the gantry 41 along its tracks 43 and 45 to a selected position while the elevator 47 is being raised. Referring to FIG. 16, operation of the gantry is affected by energizing the pressure compensated pump 305 to deliver pressurized fluid through the metering valve 331 to the directional valve 333. The directional valve 333 is positioned to drive the reversible hydraulic pump 95 in the desired direction for moving the gantry 41 along its track 45. It will be noted that if excess fluid is delivered to the pump 95 it will be relieved through check valves 343 or 345 and relief valve 341. If the metering valve 331 is closed while the gantry 41 is moving down its track, the pump 95 will continue to rotate but fluid will be available thereto through either the check valve 347 or 349 thus preventing cavitation. It will be noted that the directional valve 333, in case of emergency, may be switched to reverse the direction of the motor 95 thus acting to brake movement of the gantry 41.

Normally, braking of the gantry is effected by opening the brake valve 431 (FIG. 16) to enable the cylinders 419 to retract and the compression springs 417 to expand and extend the brake pistons 413 (FIGS. 11 and 12).

Simultaneous with the above, or after the gantry 41 has reached the desired position, the elevator 47 may be gradually raised to the desired level by opening the elevator control valve 355 (FIG. 16) to provide pressure to the elevator motor 111. Alternatively, the bypass solenoid 379 may be opened to provide a rapid rate of flow to the motor 111 for rapidly elevating the elevator.

When the elevator 47 and gantry 41 are properly positioned for convenient access by the operator 61 to the article 37 which are to be selected, the conveyors 51 and 53 are raised to their horizontal position shown in FIG. 1 by depressing a control button (not shown) which shifts the pitch control solenoid 461 to communicate pressure from the accumulator 469 through oriphice 465 and the flow divider 471 to the dead ends of the cylinders 173. Approximately one second after the solenoid 461 is actuated, the solenoid 463 will be automatically shifted to provide hydraulic fluid flow therethrough thus effecting a rapid rate of fluid introduction into the cylinders 173 and rapidly raising the conveyors 51 and 53. If desired, switches may be disposed adjacent the conveyors 51 or 53 to be automatically opened when the conveyors approach their horizontal position thus first de-energizing the solenoid 463 to slow the rate of rise of such conveyors and to subsequently shift the solenoid 461 to stop such conveyors in a horizontal position.

As the conveyors 51 and 53 are loaded, their respective belts may be intermittently actuated to move the articles therealong to provide space for the operator 61 to place additional articles 37. After the conveyors 51 and 53 have been loaded with the desired articles 37, the elevator 47 may be lowered and the conveyors 51 and 53 simultaneously lowered to the positions shown in FIG. 18.

It will be noted that the elevator 47 is held in its elevated position by the check valve 357 and closed control valve 355. When it is desirable to lower the elevator, the pilot operated check valve 357 is opened by actuation of the solenoid 358 and the weight of the elevator will provide pressure in the conduit 356 to effect actuation of the valve 357. The proportional control valve 355 may then be slowly opened and the motor 111 will commence turning in the reverse direction of the directional arrow to draw hydraulic fluid through the conduit 361 via check valve 515 from the bottom of the reservoir 301. Lowering of the elevator 47 is braked by opening the solenoid 397 to apply pressure to the brake cylinder 395 in proportion to the degree to which the control valve 355 is opened to thus resist reverse turning of the motor 111.

The electric brake 405 may be applied at any time and will automatically be applied when an electrical failure is experienced thus locking the elevator 47 in position. The electric brake 405 will positively prevent drift of the elevator 47 and can be utilized to hold the elevator in its elevated position even while articles are stored thereon.

Lowering of the conveyors 51 and 53 is accomplished by opening the solenoid valve 479 and 481 to open the respective hydraulic check valves 475 and 477 to permit flow into the flow divider 471 and through the orifice 465 back to the reservoir 301. Approximately one second after the solenoid valve 461 has been shifted to direct flow to the reservoir 301, and the conveyors 51 and 53 have smoothly commenced a downward movement, the solenoid valve 163 will automatically open to permit a more rapid rate of flow to increase the rate of lowering of such conveyors. When the conveyors 51 and 53 approach the position shown in FIG. 13, a switch 510 (FIGS. 13 and 15) disposed adjacent one of such conveyors is engaged and opened to close the fast solenoid 463 thus forcing hydraulic fluid to flow through the oraphice 465 to slow the rate of lowering such conveyors. Subsequently switches 512 are contacted by the conveyor 51 or 53 to close the pilot valves 479 and 481 to cause the check valves 475 and 477 to close thus locking the conveyors 51 and 53 in the position shown in FIG. 13.

A third switch 514 is arranged to be disposed over the conveyors 51 and 53 and in their path when they are inclined as shown in FIG. 13 whereby if such conveyors tend to raise after the solenoids 479 and 481 have been de-energized, such third switch will be closed to re-energize such solenoids to affect subsequent re-lowering of the conveyors 51 and 53. Transfer of the articles 37 from the conveyors 51 and 53 to the collecting conveyors 57 and 59 is accomplished by opening the solenoids 457 and 455 to drive the motors 451 and 453 coupled to the conveyor belts.

When pallets of articles 37 are to be stored in the warehouse, the conveyors 51 and 53 may be removed by extending them into respective cradles 179 and disconnecting the pivot pins 171 and respective cylinders 173. The gantry 41 may then be moved down the tracks 43 and 45 to the location of pallets 35 of articles 37 to be stored and the forks 201 and 202 extended by moving them transversely on their tracks 187 and 189 to receive the pallets. The elevator 47 is then raised slightly to pick the pallet up and the forks 201 and 202 retracted to dispose such pallet centrally within the elevator 47. It will be noted that the controls 506 for each of the forks 201 and 202 are independent and located on the same ends of the platform 48 as the respective forks 201 and 202 to prevent accidental extension of one of such forks and consequent damage when the gantry is moved. The operator 61 then moves the gantry 41 down the track to the desired location in the stack 31 or 33 and raises the elevator 47 to the selected position for disposition of the pallet 35. The forks 201 and 202 are then selectively moved transversely to position the pallets 35 in the desired locations in the stack. It will be clear that the forks 201 or 202 may be flipped to extend to either side of the elevator 47 and may be moved transversely in either direction for receipt of a pallet and deposit thereof. Further, by using pallets which are closed on both their top and bottom sides, the forks 201 and 202 may be flipped while the empty pallet remains thereon.

Sensing elements, such as photo-electric cells and light sources may be arranged in alignment along the sides of the gantry 41 to sense any articles 37 that may accidentally extend from the stacks 31 or 33 to render the gantry inoperative and prevent striking such extending articles.

From the foregoing it will be apparent that the stacker crane system of present invention provides an economical and convenient means for collecting selected articles from a warehouse and depositing them at a collecting point. Further, the stacker crane system provides means for conveniently conveying pallets of articles to selected areas throughout the warehouse for storage.

Various modifications and changes may be made with regard to the foregoing detailed description without departing from the spirit of the invention.

I claim:

1. Fork lift apparatus for depositing and retrieving pallets on opposite sides of a narrow aisle and comprising:
    fork frame means including a truck track mounted thereon projecting transversely in said aisle;
    fork frame support means for shifting said fork frame longitudinally in said aisle;
    truck means mounted on said truck track for travel therealong;
    truck drive means for driving said truck means along said truck track to opposite sides of said aisle;
    elongated and substantially planer tine means pivotally carried on one end from said truck means;
    means on said truck means to support said tine means when said tine means are in said first and second horizontal positions, lifting means for raising and lowering said truck means and said tine means;
    fork flip means coupled with said tine means for selectively rotating said tine means about a horizontal axis to first extend toward one side when in a first substantial horizontal position and then to rotate said tine means about said horizontal axis through substantially 180° to a second substantial horizontal position to extend to the other side of said aisle whereby said fork drive means may be actuated to rotate said tine means to extend one side of said aisle for depositing a pallet carried thereon and said tine flip means may then be actuated to rotate said fork about said horizontal axis through substantially 180° to extend toward the other side of said aisle.

2. Fork lift apparatus as set forth in claim 1 wherein:
    said tine means is in the form of a pair of tines and said fork flip means includes a pivot rod having said pair of tines fixedly secured to the opposite ends thereof.

3. Fork lift apparatus as set forth in claim 1 wherein:
    said truck drive means includes a pair of sprockets mounted on at the opposite extremities of said truck track means, endless chain means carried on said sprockets and connected with said truck means and a drive motor for driving one of said sprockets.

4. Fork lift apparatus as set forth in claim 1 wherein:
    said support means includes a track extending longitudinally in said aisle and support wheels mounted thereon for carrying said fork frame means.

5. Fork lift apparatus as set forth in claim 1 wherein:
    said fork flip means includes a pivot rod carried from said truck means and having said tine means fixedly carried therefrom, a driven gear carried on said rod and drive motor means including a drive gear meshed with said driven gear.

6. Fork lift apparatus as set forth in claim 2 wherein:
    said fork flip means includes a driven gear fixedly mounted on said rod and reversible motor means including a drive gear for driving said driven gear.

7. Fork lift apparatus as set forth in claim 2 wherein:
    said truck drive means includes a pair of sprockets mounted on at the opposite extremities of said truck track means, endless chain means carried on said sprockets and connected with said truck means and a drive motor for driving one of said sprockets.

8. Fork lift apparatus as set forth in claim 2 wherein:
    said support means includes a track extending longitudinally in said aisle and support wheels mounted thereon for carrying said fork frame means.

9. Fork lift apparatus as set forth in claim 3 wherein:
    said support means includes a track extending longitudinally in said aisle and support wheels mounted thereon for carrying said fork frame means.

* * * * *